Dec. 1, 1925.
M. BUGAR
1,563,720
HELICOPTER ATTACHMENT FOR AEROPLANES
Filed March 2, 1925
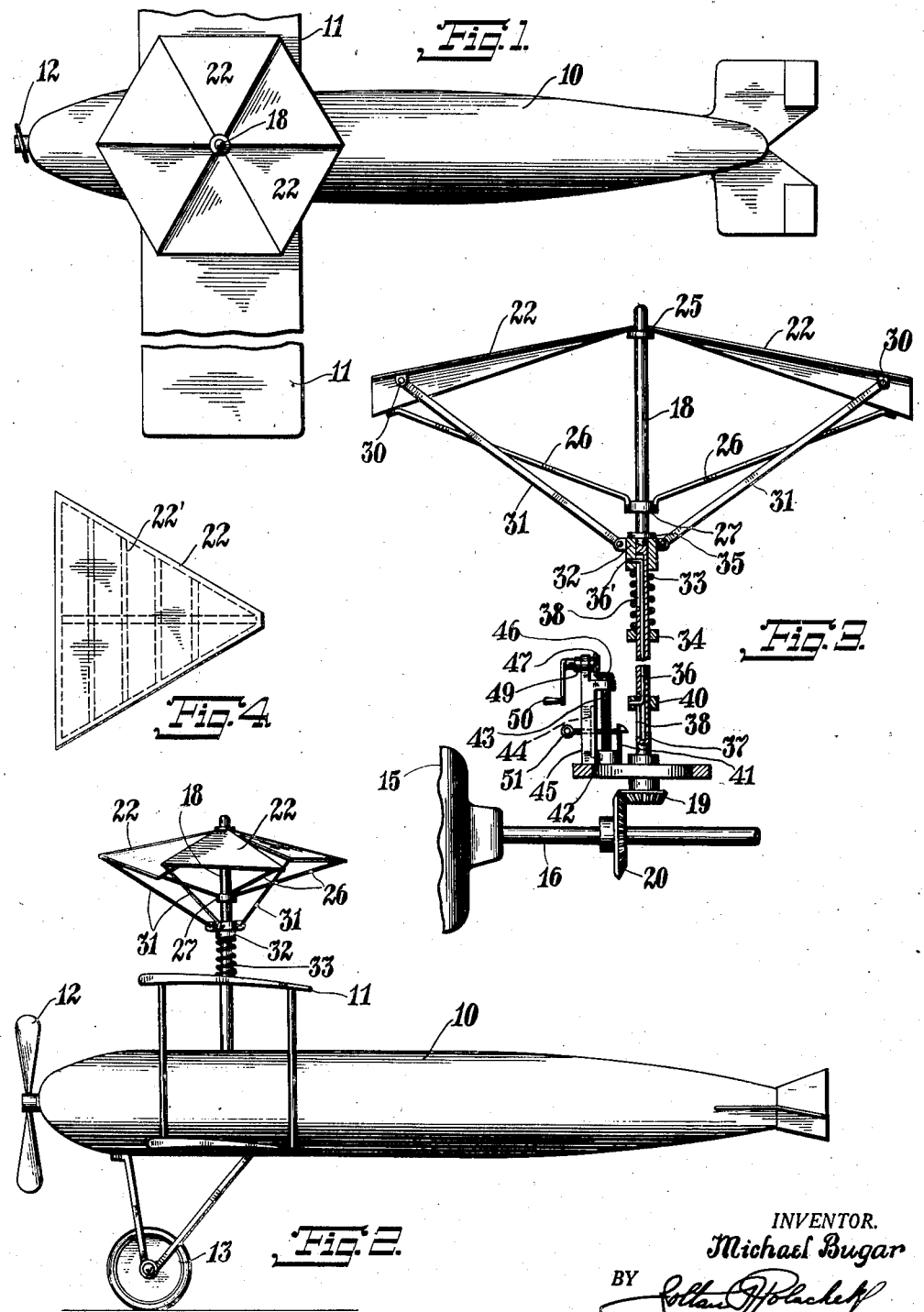
INVENTOR.
Michael Bugar
BY
ATTORNEYS.

Patented Dec. 1, 1925.

1,563,720

UNITED STATES PATENT OFFICE.

MICHAEL BUGAR, OF CINCINNATI, OHIO.

HELICOPTER ATTACHMENT FOR AEROPLANES.

Application filed March 2, 1925. Serial No. 12,502.

*To all whom it may concern:*

Be it known that I, MICHAEL BUGAR, a citizen of Czechoslovakia, residing at Cincinnati, in the county of Hamilton and State of Ohio, have invented certain new and useful Improvements in Helicopter Attachments for Aeroplanes, of which the following is a specification.

This invention relates to a helicopter attachment for aeroplanes, designed to facilitate ascent or descent of the aeroplane, or to permit of the same hovering over desired spots.

The invention has for an object to provide a novel and improved device of this sort, mounted on a shaft that extends upward from the body of the aeroplane and having a series of vanes arranged for adjustment in a novel manner.

For further comprehension of the invention, and of the objects and advantages thereof, reference will be had to the following description and accompanying drawing, and to the appended claim in which the various novel features of the invention are more particularly set forth.

Fig. 1 of the drawing is a plan view showing an aeroplane having my improved helicopter attachment.

Fig. 2 is a side view thereof.

Fig. 3 is a fragmentary central longitudinal sectional view, illustrating more particularly the means for adjusting the vanes of the helicopter.

Fig. 4 is a detail plan view of one of the helicopter vanes.

In the drawing the reference numeral 10 indicates the body of an aeroplane of the biplane type, having planes 11, the usual tractor propeller being indicated at 12 and chassis structure at 13. A portion of the engine, which may be of the usual internal combustion type, is shown at 15, and of the main shaft thereof, which drives the propeller 12, at 16. According to my invention I mount in the aeroplane a vertical shaft 18 which extends at its lower end into the body of the aeroplane and has fixed on its said lower end a bevel gear 19 meshing with a like gear 20 on the engine shaft 16 whereby the helicopter shaft 18 is driven. The upper portion of the shaft 18 extends through and above the top plane of the machine where suitable bracing bearings may be provided.

This shaft has the helicopter device mounted on its upper end to be rotated therewith. This device comprises a series of triangular vanes 22, which may be conveniently made from aeroplane cloth stretched over the lattice like frame elements 22'. These vanes radiate out from the shaft and jointly produce a helicopter wheel of hexagonal form as seen in plan view. The vanes are rigidly attached at their inner ends to a common collar 25 on the upper end of the shaft 18, while each has one outer corner thereof rigidly attached to the upper end of a strut 26, which extends downwardly and inwardly to be attached at its other end to another collar 27 fixed on the shaft 18. As will be understood, there are a series of these struts, one for each vane.

At their other outer corners the vanes have loose hinged connections 30 with the upper ends of stretchers 31 which have a loose pivotal connection at their lower ends with a common sleeve or elongated collar 32 that is slidable upon the shaft 18. Surrounding the shaft 18, below the sleeve 32 and bearing upward on the latter, is a coiled expansion spring 33, its abutment being furnished by a collar 34 fixed on the shaft 18, while upward movement of the sleeve is limited by another collar 35 on the shaft 18 above the said sleeve.

To adjust the sleeve 32 downward, and thereby move the vanes to neutral or zero position, I provide a rod 36 that extends through a longitudinal boring 37 in the shaft and has its opposite ends turned laterally as at 36' and 36ª, through short vertical slots 38 in the said shaft, the upper end element 36' being fixed to the sleeve 32. The lower end element, is fixed to a sliding collar 40 on the shaft that is normally engaged by a spring latch 41 that is mounted on a nut member 42 arranged for adjustment along a short vertical screw shaft 43, the nut member being held against rotation by means of a key 42' thereon that engages in a groove 44 in a guide element 45. The screw shaft 43 has fixed to the upper end thereof a bevel pinion 46 meshing with a bevel gear or pinion 48 on a stub shaft 49 to which a handle 50 is fixed for rotation purposes. The latch 41 has attached thereto a rod 51 having a handle thereon whereby the said rod may be pulled to release the latch from the element 40.

Normally the different vane elements have their front and rear edges lying in a common path of movement, the helicopter being then in zero or neutral position. By pulling the rod 51 the latch 41 may be freed, to allow the spring 33 to move the advancing edges of the vanes upward. When the latter are to be returned to neutral position the shaft 43 is rotated in one direction until the latch springs over the collar 40, and is then rotated in an opposite direction to move the collar 40 downward.

Having thus described my invention, what I claim as new and desire to protect by Letters Patent of the United States is as follows:—

In combination with an aeroplane, a vertical shaft mounted thereon, a sleeve slidable on said shaft, a helicopter wheel comprising a number of triangular vanes attached at their inner apices to the said shaft, a series of struts each attached at one end to one outer corner of the respective vanes and at their inner ends to the said shaft, a series of stretchers each having a pivotal connection at opposite ends with the other outer corners of the different vanes and said sleeve, and means for adjusting said sleeve along the said shaft in opposite directions, comprising a spring bearing on the said sleeve, a rod slidable in a longitudinal boring in the said shaft and having one end fixed to the said sleeve, a collar rigid with the lower end of the said rod and surrounding the shaft, a spring latch engaged with lower end of the rod, a nut member on which said latch is mounted, a screw shaft on which said nut member is mounted, and means for rotating said screw shaft.

In testimony whereof I have affixed my signature.

MICHAEL BUGAR.